United States Patent [19]

Shimizu et al.

[11] 4,098,975
[45] Jul. 4, 1978

[54] PROCESS FOR PREPARING POLYTETRAFLUOROETHYLENE FINE POWDERS

[75] Inventors: Tetsuo Shimizu, Osaka; Shigeru Ichiba, Kyoto; Shun Koizumi, Toyonaka; Chuzo Okuno, Takatsuki, all of Japan

[73] Assignee: Daikin Kogyo Kabushiki Kaisha, Osaka, Japan

[21] Appl. No.: 776,919

[22] Filed: Mar. 11, 1977

[30] Foreign Application Priority Data

Mar. 18, 1976 [JP] Japan .................................. 51-30080

[51] Int. Cl.$^2$ ........................... C08F 2/16; C08F 14/26
[52] U.S. Cl. ........................................ 526/73; 526/255
[58] Field of Search ................................... 526/73, 255

[56] References Cited

U.S. PATENT DOCUMENTS

| 3,817,965 | 6/1974 | Mace et al. | 526/73 |
| 3,870,691 | 3/1975 | Grimaud et al. | 526/255 |
| 3,945,985 | 3/1976 | Feiler et al. | 526/73 |
| 4,001,482 | 1/1977 | Schwab | 526/73 |

FOREIGN PATENT DOCUMENTS 44,032  11/1972  Japan ..................................... 526/73

*Primary Examiner*—Alan Holler
*Attorney, Agent, or Firm*—Larson, Taylor and Hinds

[57] ABSTRACT

A process for preparing a polytetrafluoroethylene fine powder by polymerizing tetrafluoroethylene in an aqueous medium containing a polymerization initiator and a dispersant, coagulating the resulting polymer, washing the coagulated polymer when desired, and drying the polymer, characterized in that after at least 30 wt. % of the whole amount of the tetrafluoroethylene to be polymerized has been polymerized at a constant temperature, the polymerization is conducted at an altered temperature at which the same whole amount, when polymerized, gives a polymer having an amorphous index at least 0.01 higher than when the whole amount is polymerized at the first-mentioned temperature.

6 Claims, 1 Drawing Figure

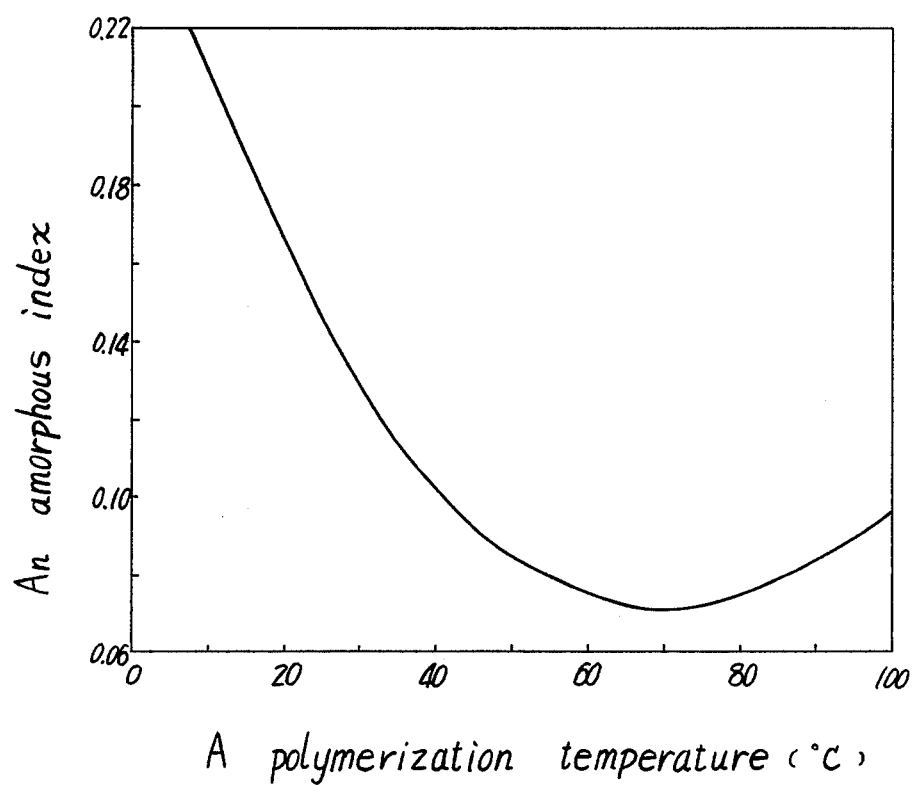

PROCESS FOR PREPARING POLYTETRAFLUOROETHYLENE FINE POWDERS

This invention relates to a process for preparing polytetrafluoroethylene fine powders.

As well known, polytetrafluoroethylene (hereinafter referred to as "PTFE") fine powders are molded by paste extrusion. British Patent Specification No. 885809 and Japanese Patent Publication No. 14937/1969 disclose processes for producing PTFE fine powders moldable by paste extrusion at high reduction ratios. According to these known processes, PTFE fine powers are produced by polymerizing tetrafluoroethylene in an aqueous medium containing polymerization initiator and a dispersant, coagulating the resulting polymer and drying the polymer, the polymerization being conducted in the presence of a modifier such as perfluoroalkylethylene, oxyperfluoroalkylethylene or like fluoroalkylethylene compound, methanol, hydrocarbon or the like. However, the use of the modifier renders both the apparatus and operation complex, leading to reduced efficiency. The PTFE fine powders obtained, although extrudable at very high reduction ratios, are difficult to continuously extrude at low reduction ratios and involve further difficulty in giving smooth-surfaced extrudates. Moreover, some modifiers are of such type that they will be incorporated into the PTFE obtained upon copolymerization with tetrafluoroethylene, entailing the tendency to impair the inherent properties of PTFE due to the occurrence of thermally and chemically weak portions therein.

An object of this invention is to provide a process for preparing PTFE fine powders amenable to paste extrusion without using any modifier.

Another object of this invention is to provide a process for preparing PTFE fine powders without using any modifier, the powders being continuously moldable by paste extrusion at low to high reduction ratios.

Another object of this invention is to provide a process for preparing PTFE fine powders capable of giving smooth-surfaced PTFE extrudates even at low reduction ratios on paste extrusion.

Still another object of this invention is to provide a process for preparing PTFE fine powders without impairing any of the inherent properties i.e. chemical and thermal stabilities, of PTFE.

These and other objects of this invention will become apparent from the following description.

This invention provides a process for preparing a PTFE fine powder by polymerizing tetrafluoroethylene in an aqueous medium, coagulating the resulting polymer and drying the polymer, characterized in that after at least 30 wt. % of the whole amount of the tetrafluorethylene to be polymerized has been polymerized at a constant temperature, the polymerization is conducted at an altered temperature at which the same whole amount, when polymerized, gives a polymer having an amorphous index at least 0.01, preferably 0.01 to 0.15, most preferably 0.01 to 0.02, higher than when the whole amount is polymerized at the first-mentioned temperature. The amorphous index as herein used is a value obtained by dividing the absorbance of an unsintered polymer at a wave number of 778 $cm^{-1}$ in its infrared absorption spectrum by the absorbance thereof at a wave number of 2367 $cm^{-1}$ therein. A greater amorphous index indicates that the polymer concerned has a higher amorphous content.

According to the conventional process for polymerizing tetrafluoroethylene in an aqueous medium containing a polymerization initiator and a dispersant to obtain a colloidal dispersion of PTFE, the polymerization is conducted at a constant temperature throughout the entire process, whereas according to the present invention, the polymerization is effected at an altered temperature after at least 30 wt. %, preferably 50 to 95 wt. %, of the tetrafluoroethylene to be polymerized has been polymerized at a constant temperature, the temperature difference being such that the amorphous index resulting from the polymerization at the altered temperature will be at least 0.01 higher than that achieved at the initial temperature if the starting monomer is completely polymerized at the respective temperatures. The polymerization temperature is thus altered in the course of the reaction based on the relation between the polymerization temperature and the content of an amorphous part of the unsintered polymer. This relation will be described below.

When tetrafluoroethylene is polymerized at constant pressure of 4 to 20 $kg/cm^2$ with use of a usual initiator and a usual dispersant at varying temperatures although the temperature is maintained at a constant level throughout the reaction for each run, the resulting polymer has varying amorphous contents. The results are given in the accompanying drawing, in which the amorphous index is plotted as ordinate and the polymerization temperature as abscissa. Since the relation therebetween varies with the change in the polymerization conditions, such relation must be determined when the polymerization conditions change. (The polymerization temperature is the temperature which is maintained throughout the entire polymerization. For exmaple, at a polymerization temperature of 20° C, the starting material is kept at 20° C throughout the entire period of polymerization.) With reference to the drawing, the polymer obtained, for example, at a polymerization temperature of 40° C has an amorphous index of about 0.12, and at 100° C the index is 0.10.

To exemplify with reference to the drawing, 50 wt.% of tetrafluoroethylene is polymerized first at 40° C, and the remaining 50 wt.% is thereafter polymerized at 18° C, or the polymerization is carried out at 70° C in the first stage and at 90° C in the second stage.

With this invention, the polymerization temperature may be altered at any time after at least 30 wt.%, preferably 50 to 95 wt.%, of the whole amount of the tetrafluoroethylene to be polymerized has been polymerized. Although the time to alter the polymerization temperature is in such a wide range, the polymerization subsequent to the alteration of the temperature must be completely carried out at a temperture which will give an amorphous index at least 0.01 higher than the amorphous index corresponding to the preceding temperature. However, the subsequent polymerization need not necessarily be conducted at a constant temperature but may be effected at varying temperatures insofar as they are at least 0.01 higher in terms of corresponding amorphous index. For example, when the first-stage reaction is conducted at a polymerization temperature of 70° C (amorphous index: about 0.07), the temperature for the second-stage reaction need not always be constant but may vary insofar as the temperature gives an amorphous index of at least 0.08. Thus, the second-stage reaction may be effected first at 40° C and thereafter at 30° C, although the reaction can be carried out at a constant temperature of 40° C.

If the polymerization of this invention is conducted, for example, at 80° C in the first stage and thereafter at 30° C, the reaction requires the use of a stabilizer melting at below 30° C and the use of an initiator fully active at 30° C and 80° C, consequently imposing limitations on the stabilizers and initiators usable. Thus, very wide variations in the polymerization temperature are unfavorable for practical purposes. The present process, however, gives the desired effects on the extrudability of the resulting product as far as the process involves a relatively small variation in the polymerization temperature which will not produce any significant influence on the stabilizer or the initiator. For instance, the polymerization can be carried out free of any practical problem when effected at 70° C in the first stage and at 90° C in the second stage. This operation involves a difference of about 0.012 between the amorphous index resulting from the polymerization as conducted at a constant temperature of 70° C throughout the entire reaction and the amorphous index given by the polymerization as conducted constantly at 90° C. (see the drawing). The amorphous index difference satisfactorily fulfils the requirement contemplated by the invention.

The process of this invention can be practiced under exactly the same polymerization conditions as in the conventional process except that the polymerization temperature is altered as already specified. For example, a wide variety of known polymerization initiators are usable. More specific examples are redox-type initiators for use at relatively low temperatures, and persulfates and disuccinic acid peroxide for use at relatively high temperatures. These polymerization initiators are used in the same amount as in the conventional process, for example, in an amount of 0.0001 to 0.5 wt. % based on tetrafluoroethylene. Examples of useful dispersants are those heretofore known, including water-soluble salts of polyfluoroalkyl compounds such as alkali metal salts or ammonium salts of perfluorooctanoic acid, perfluorocaprylic acid ω-hydroperfluoroheptanoic acid, ω-hydroperfluorononanoic acid and like acid. These dispersants are used in the same amount as in the conventional process, namely in an amount of 0.005 to 10 wt. %, preferably 0.005 to 2.0 wt. %, based on an aqueous medium. When desired, known stabilizers are usable such as paraffin wax, liquid paraffin, etc. The polymerization pressure is the same as heretofore used and is usually about 1 to about 100 kg/cm², peferably about 4 to about 20 kg/cm². Useful polymerization temperatures are in the same range as in the conventional process and may range, for example, from 0° to 150° C, preferably from 10° to 100° C. The polymerization proceeds up to the very moment the produced polymer starts to coagulate and stops immediately before the occurrence of coagulation.

The particles of colloidal PTFE obtained by the polymerization process of this invention are about 0.1 to about 0.5 mµ in number average particle size. In the course of the polymerization, the particle size progressively increases. Accordingly, the outer shell protion of the particles to be formed in the second stage of the polymerization is formed while being influenced by the ambient polymerization temperature. The polymerization conducted at varying temperatures as in the present process gives polymer particles whose outer shell portion has a higher amorphous content than those obtained at a constant polymerization temperature. Presumably, the outstanding paste extrusion performance of the product of the present process is attributable to such structure of the polymer particles.

The aqueous dispersion of PTFE obtained by the polymerization process of this invention is suitably diluted when so desired, then coagulated and dried, giving a PTFE fine powder. During or after the coagulation, the polymer particles may be granulated to a uniform size. The coagulation and granulation can be satisfactorily carried out by conventional methods.

The PTFE fine powders prepared by the present process are characterized in that they are moldable by paste extrusion at high reduction ratios and that they are moldable continuously by paste extrusion at low to high reduction ratios. Moreover, the powders have the inherent properties of PTFE free of any degradation since no modifier is used. The powders have improved flowability, thereby reducing the difficulty to be otherwise encountered when the powder is handled for extrusion.

Examples and Comparison Examples are given below, in which the parts and percentages are all by weight. The paste extrusion performance of the PTFE fine powders is determined by the following method.

The polymer powder (100 g) is fully wetted with 20 g of hydrocarbon lubricant consisting predominantly of isoparaffin ("ISOPAR-E," trade mark of Esso Standard Petroleum Co., Ltd., bp: about 125° C). The resulting paste is charged into a cylinder having an inside diameter of 31.8 mm and provided with a die at its lower end. The die has a reduction angle of 30° and is formed at its lower end with an orifice 3.2 mm in inside diameter and 7 mm in land length. Additionally, two dies are prepared; one having an orifice 1.2 mm in inside diameter and 5 mm in land length, and the other having an orifice 0.8 mm in inside diameter and 3 mm in land length. The dies are interchangeable to give the desired reduction ratio. The paste is extruded downward from the orifice at a ram speed of 20 mm/min, and the pressure is recorded during the extrusion. When the pressure stabilizes to a steady level, the value is taken as the extrusion pressure.

EXAMPLE 1

A 0.75 l quantity of deionized deoxidized water, 30 g of paraffin wax (M.P. 56° C) and one g of ammonium perfluorooctanoate serving as a dispersant are placed into a 1.5-liter glass autoclave equipped with a stirrer and a temperature-controlling jacket fitted therearound. The temperature is controlled to 70° C while the interior atmosphere of the autoclave is being replaced by nitrogen gas several times and futher by tetrafluoroethylene (TFE) several times. The TFE charge is finally adjusted to an internal pressure of 8.0 kg/cm² gauge at 70° C, whereupon 20 mg of persulfate is placed into the autoclave, and the stirrer is initiated into rotation at 600 r.p.m. to start polymerization. TFE is continuously fed to the autoclave so as to maintain the internal pressure of 8.0 kg/cm² gauge at all times during the reaction. The temperature within the autoclave is maintained at 70° C. When 50% of the TFE to be polymerized has been consumed, the polymerization temperature is progressively raised by adjusting the water temperature in the jacket so that the temperature reaches 90° C upon consumption of 60% of the TFE. The polymerization system is thereafter maintained at 90° C. When 220 g of TFE has been consumed, the polymerization is terminated, the reaction mixture is cooled and then coagulated. The product is thoroughly washed with water and dried, giving a PTFE powder. The powder is tested for paste extrusion performance at reduction ratios of about 100, 700 and 1580. The results are listed in Table 1 given later in which the appearance of the extrudates is evaluated according to the following criteria:
 A: Smooth-surfaced extrudate free of any undulation.
 B: Undulating and rough-surfaced extrudate.
 C: Discontinuous or markedly undulating extrudate.

Table 1 reveals that the polymer powder is extrudable at low pressures, giving extrudates of good appearance. The results of Comparison Examples 1 and 2 to be given later indicate that the above polymerization conditions involve a difference of 0.016 between the amorphous index corresponding to 70° C in the first-stage reaction and that corresponding to 90° C in the second-stage reaction.

EXAMPLE 2

Polymerization is conducted under the same conditions as in Example 1 except that the polymerization temperature is maintained at a constant level of 70° C first, thereafter progressively raised on the polymerization of 84% of the TFE to be polymerized and maintained at 92° C on and after the polymerization of 92% of the TFE. The results are as satisfactory as in Example 1.

The same procedure as above is repeated except that a constant polymerization temperature of 92° C is maintained throughout the reaction, giving a polymer having an amorphous index of 0.115.

This indicates a difference of about 0.021 between the amorphous index corresponding to 70° C and that corresponding to 92° C.

EXAMPLE 3

Polymerization is conducted under the same conditions as in Example 1 except that 100 mg of disuccinic acid peroxide is used as an initiator in place of ammonium persulfate, giving satisfactory results as in Example 1.

The same procedure as above is repeated twice except that the polymerization is completed at constant temperatures of 70° C and 90° C respectively, and the amorphous indexs of the resulting polymers are determined. There is a difference of about 0.012 between the two.

COMPARISON EXAMPLES 1 AND 2

The same procedure as in Example 1 is repeated except that the polymerization is completed at constant temperatures of 70° C (Comparison Example 1) and 90° C (Comparison Example 2), with the results given in Table 1.

COMPARISON EXAMPLE 3

Polymerization is conducted under the same conditions as in Example 1 except that the polymerization temperature is maintained at a constant level of 72° C first, thereafter progressively raised on the polymerization of 50% of the TFE to be polymerized and maintained at 82° C after 60% of the TFE has been polymerized. The results are not satisfactory, although improved to some extent.

Polymers are prepared by the same procedure as above except that the polymerization is completed at constant temperatures of 72° C and 82° C respectively. They differ from each other by 0.006 in amorphous index.

COMPARISON EXAMPLE 4

The same procedure as in Example 1 is repeated except that the polymerization temperature is raised progressively from 70° C on and after the consumption of 10% of the TFE to be polymerized and is maintained at a constant level of 90° during the polymerization of about 80% remaining portion of the TFE. The results are as unsatisfactory as in Comparison Example 3.

Table 1 below shows the polymerization conditions in the foregoing Examples and Comparison Examples and the paste extrusion performance of the resulting powders.

Table 1

| | Polymerization temperature | | | Difference in amorphous index** | Amorphous index of polymer obtained | Paste extrusion performance | | | | | |
|---|---|---|---|---|---|---|---|---|---|---|---|
| | Initial | | | | | Reduction ratio: 100 | | Reduction ratio: 700 | | Reduction ratio: 1580 | |
| | | | | | | Extrusion | | Extrusion | | Extrusion | |
| | (° C) | Yield* (%) | Altered (° C) | | | pressure (kg/cm²) | Appearance | pressure (kg/cm²) | Appearance | pressure (kg/cm²) | Appearance |
| Ex. 1 | 70 | (50–60) | 90 | 0.016 | 0.108 | 145 | A | 615 | A | 980 | A |
| Ex. 2 | 70 | (84–92) | 92 | 0.021 | 0.105 | 130 | A | 620 | A | 1000 | A |
| Ex. 3 | 70 | (50–60) | 90 | 0.012 | 0.109 | 114 | A | 650 | A | 1100 | A |
| Comp.Ex.1 | 70 | — | not altered | 0 | 0.094 | 150 | A | 730 | B | Discontinuous | C |
| Comp.Ex.2 | 90 | — | not altered | 0 | 0.110 | 165 | A | 745 | B | 1200 | B |
| Comp.Ex.3 | 72 | (50–60) | 82 | 0.006 | 0.097 | 145 | A | 700 | B | 1100 | B |
| Comp.Ex.4 | 70 | (10–20) | 90 | 0.016 | 0.108 | 150 | A | 720 | B | 1150 | B |

Notes:
*Yield of the polymer obtained by the first-stage reaction at the initial temperature relative to the overall yield.
**Difference between the amorphous index corresponding to the initial temperature and that corresponding to the altered temperature.

What is claimed is:

1. In a process for preparing a polytetrafluoroethylene fine powder in which tetrafluoroethylene is polymerized in an aqueous medium containing a polymerization initiator and a dispersant to form a polytetrafluoroethylene polymer, coagulating the resulting polymer, washing the coagulated polymer, and drying the washed polymer, the improvement wherein at least 30% of a quantity of tetrafluoroethylene to be polymerized is polymerized at constant temperature in said aqueous medium and wherein further polymerization of said tetrafluoroethylene is effected in said aqueous medium at a different temperature at which said amount of tetrafluoroethylene produces a polytetrafluoroethylene polymer having an amorphous index at least 0.01 higher than when said amount of tetrafluoroethylene is polymerized at said constant temperature.

2. The process for preparing a polytetrafluoroethylene fine powder according to claim 1, in which after 50 to 95 wt. % of the whole amount of the tetrafluoroethylene to be polymerized has been polymerized at a constant temperature, the polymerization is conducted at an altered temperature at which the same whole amount, when polymerized, gives a polymer having an amorphous index at least 0.01 higher than when the whole amount is polymerized at the first-mentioned temperature.

3. The process for preparing a polytetrafluoroethylene fine powder according to claim 1, in which the polymerization is conducted at an altered temperature at which the same whole amount, when polymerized, gives a polymer having an amorphous index 0.01 to 0.15 higher than when the whole amount is polymerized at the first-mentioned temperature.

4. The process for preparing a polytetrafluoroethylene fine powder according to claim 3, in which the polymerization is conducted at an altered temperature at which the same whole amount, when polymerized, gives a polymer having an amorphous index 0.01 to 0.02 higher than when the whole amount is polymerized at the first-mentioned temperature.

5. The process for preparing a polytetrafluoroethylene fine powder according to claim 1, in which the polymerization is conducted at 10° to 100° C.

6. A polytetrafluoroethylene fine powder prepared by the process claimed in claim 1.

* * * * *